(12) United States Patent
Elissen

(10) Patent No.: US 8,042,456 B2
(45) Date of Patent: Oct. 25, 2011

(54) MILK FROTHER

(75) Inventor: Petrus Adrianus Johannes Maria Elissen, Laren (NL)

(73) Assignee: Foremost B.V., Eemnes (NL)

( * ) Notice: Subject to any disclaimer, the term of this patent is extended or adjusted under 35 U.S.C. 154(b) by 428 days.

(21) Appl. No.: 12/440,642

(22) PCT Filed: Aug. 1, 2008

(86) PCT No.: PCT/NL2008/000186
§ 371 (c)(1),
(2), (4) Date: Mar. 10, 2009

(87) PCT Pub. No.: WO2009/020384
PCT Pub. Date: Feb. 12, 2009

(65) Prior Publication Data
US 2009/0266240 A1    Oct. 29, 2009

(30) Foreign Application Priority Data

Aug. 8, 2007    (NL) .................................... 1034240

(51) Int. Cl.
*B01F 3/04* (2006.01)
(52) U.S. Cl. ..................................................... 99/323.3
(58) Field of Classification Search .................. 99/275, 99/279, 288, 302 C, 323, 323.1, 323.3, 452
See application file for complete search history.

(56) References Cited

U.S. PATENT DOCUMENTS

| | | | |
|---|---|---|---|
| 4,480,926 A | 11/1984 | Lattery, Jr. et al. | |
| 5,912,039 A | 6/1999 | Browne | |
| 6,792,848 B1 * | 9/2004 | Janky | 99/285 |
| 6,840,163 B2 * | 1/2005 | Oldani et al. | 99/453 |
| 7,669,517 B2 * | 3/2010 | Boussemart et al. | 99/287 |
| 2001/0036124 A1 | 11/2001 | Rubenstein | |
| 2007/0221068 A1 * | 9/2007 | Boussemart et al. | 99/279 |
| 2009/0020018 A1 * | 1/2009 | Melzer et al. | 99/288 |

(Continued)

FOREIGN PATENT DOCUMENTS

CN    201033032 Y    3/2008

(Continued)

OTHER PUBLICATIONS

International Search Report; International Application No. PCT/NL2008/00186; Completed Dec. 4, 2008.

(Continued)

*Primary Examiner* — Mark Graham
(74) *Attorney, Agent, or Firm* — Mollborn Patents, Inc.; Fredrik Mollborn

(57) ABSTRACT

Methods and device for frothing milk. The device includes a main body forming a container for the milk, a cover fitting onto the main body, agitation means and drive means for driving the agitation means. The drive means are received at least partially in the cover. The device further includes a base plate provided with a first electric contact. The main body is provided with a second electric contact, which makes electrical contact with the first electric contact when the main body is placed on the base plate. The drive means are provided with a third electric contact. The main body is provided with a fourth electric contact, which makes electrical contact with the third electric contact when the cover is placed on the main body. The main body is provided with an electric conductor which forms an electrical connection between the second electric contact and the fourth electric contact.

10 Claims, 4 Drawing Sheets

U.S. PATENT DOCUMENTS

| | | | |
|---|---|---|---|
| 2009/0101021 A1* | 4/2009 | Tonelli et al. | 99/290 |
| 2009/0263550 A1* | 10/2009 | Navarini et al. | 426/506 |
| 2010/0112150 A1* | 5/2010 | Navarini et al. | 426/231 |
| 2011/0146500 A1* | 6/2011 | Boussemart et al. | 99/323.1 |

FOREIGN PATENT DOCUMENTS

| | | |
|---|---|---|
| CN | 201061480 Y | 5/2008 |
| DE | 19645564 | 5/1998 |
| DE | 102004043579 | 5/2006 |
| EP | 1440648 | 7/2004 |
| EP | 1483998 | 12/2004 |
| EP | 1656866 | 5/2006 |
| GB | 384569 | 12/1932 |
| GB | 2454421 B | 8/2009 |
| KR | 1020060010100 A | 2/2006 |
| WO | WO2005089572 | 9/2005 |

OTHER PUBLICATIONS

GB0903221.0 Examination Report under Section (18)3. Intellectual Property Office. Patents Directorate. Concept House, Cardiff Road, Newport, South Wales , NP10 8QQ. Dated Jul. 3, 2009.

Notification of Grant: U.S. Appl. No. GB2454421. Intellectual Property Office. Patents Directorate. Concept House, Cardiff Road, Newport, South Wales , NP10 8QQ. Dated Jul. 28, 2009.

European Patent Office Communication under Rule 71(3) EPC intent to grant EP08779010 and result of consultation. European Patent Office. Postbus 5818, 2280 HV Rijswijk, Netherlands. Dated Aug. 28, 2009.

* cited by examiner

MILK FROTHER

CROSS-REFERENCE TO RELATED APPLICATION

The present application claims the priority of PCT Application No. PCT/NL2008/000186, titled "Milk Frother," which was filed on Aug. 1, 2008, which in turn claims the priority of Dutch Patent Application No. NL-1034240, titled "Milk Frother," which was filed on Aug. 8, 2007, both of which are incorporated herein by reference.

BACKGROUND

This invention relates to a device for frothing milk. Devices for frothing milk are known. In addition to the frequently applied frothers based on steam, frothers on the basis of an agitation element to be immersed in the milk have been known for many years and in diverse embodiments. The agitation element is here driven 'from above' or 'from below' by hand, electromechanically or magnetically. In DE102004043579 we thus find a rechargeable handheld milk frother with a rotating annular spiral spring which must be immersed in the milk to be frothed. In GB384569 we find an example of a mixer for liquids, comprising a frame consisting of a base and a stand having mounted thereon a housing with an electric motor which drives a shaft on which a stirrer or mixer head is mounted. A container with a liquid for mixing must be placed on the base. In U.S. Pat. No. 5,912,039 we find an example of a milk frother comprising a frame consisting of a base and a stand having mounted thereon an electric motor and a mixer which has to be immersed in the milk. A container with milk for frothing must be held such that the rotating mixer is situated in the milk. The devices with frames are heavy, bulky, complex and expensive, and therefore not suitable in many situations. The necessary heating of the milk must always take place elsewhere in the case of said devices. Milk frothers can also be built into a coffee-maker, see for instance EP1440648 or EP1483998. WO2005089572 describes a milk frother comprising a frame consisting of a base with a heating element on which a container with milk for frothing has to be placed, and stirring means. It is possible herewith to heat the milk to a desired temperature, and subsequently mix and froth the milk, but this machine is also heavy, bulky, complex and expensive, and therefore less suitable in many situations. US2001/0036124 relates to a beverage container with integrated stirring device comprising a housing, a base and a lid. A stirring device is arranged in the base. The agitation element is situated in the vicinity of the bottom of the container and is driven 'from below'. EP1656866 describes a milk frother comprising a container, a housing, a drive system and a base plate. Heating means are built into the container and are powered together with the motor via the base plate. Here also the agitation element is situated in the vicinity of the bottom of the container and is driven 'from below'. If the agitation means are arranged in (the vicinity of the bottom of) the container, they are however difficult to clean. U.S. Pat. No. 4,480,926 describes a mixing cup comprising a container, a removable cover and a motor. The motor is arranged in the cover and is powered via a cord which is attached to a handle, this handle in turn being mounted on the cover. The cord is however irksome during handling of the mixing cup and cleaning of the agitation means, and the plug must first be removed from the wall socket in order to enable cleaning of the agitation means. In DE19645564 are described different embodiments of a mixing cup, wherein the agitation means can be driven by a motor placed in a cover or a base. The coupling between motor and agitation means can herein be of a magnetic or mechanical nature. In the case the motor is placed in the cover, and the agitation means are driven 'from above', a frame is necessary for this purpose. This once again makes the apparatus heavy, bulky, complex and expensive, and therefore less suitable in many situations.

There is therefore a need for a device for frothing milk which does not have the stated drawbacks in respect of weight, volume, complexity, cost price, appearance, production and use of prior art devices.

SUMMARY

In general, in one aspect, the invention provides methods and apparatus for frothing milk. The device includes a main body, which forms a container for the milk, a cover fitting onto the main body, and agitation means and drive means for driving the agitation means. The drive means are received at least partially in the cover. The device also includes a base plate provided with a first electric contact. The main body is provided with a second electric contact, which makes electrical contact with the first electric contact when the main body is placed on the base plate. The drive means are provided with a third electric contact. The main body is provided with a fourth electric contact, which fourth electric contact makes electrical contact with the third electric contact when the cover is placed on the main body. The main body is provided with an electric conductor which forms an electrical connection between the second electric contact and the fourth electric contact.

Various embodiments can include one or more of the following features and advantages. The base plate can be connected to the mains electricity in a home, and optionally for instance also to the electrical system in a vehicle. The cover can for instance be placed loosely on the main body or be connected hingedly thereto. By providing the drive means with electrical energy from the base plate by means of the electric conductor, it is possible to build the drive means wholly or partially into the cover without a separate cord or a separate frame being necessary for the electric power supply thereto, this resulting in great advantages in respect of weight, volume, complexity, cost price, appearance, production and use of the device.

The drive means can herein be connected mechanically in fixed manner to the cover or mechanically coupled in releasable manner to the cover. The drive means can also be at least partially received in a recess provided for this purpose in the main body, being arranged for instance in a handle. The fact that the main body, the cover and the drive means are releasable from each other makes cleaning of the device simpler. The at least partial accommodation of the drive means in a recess in the main body makes a correct placing of the drive means simpler and provides for support thereof. This will be further elucidated in the following description of exemplary embodiments of a device according to the invention.

The agitation means are preferably coupled mechanically in releasable manner to the drive means. Cleaning in this way becomes even simpler, and the user can, if desired, then readily exchange the agitation means for another type. The agitation means preferably include a substantially annular spiral spring. Such a spiral spring is found to suffice well in practice. The agitation means can herein be placed out of centre in the container. This is found to result in a better mixing and frothing of the milk.

The device preferably also includes heating means which are at least partially received in the main body. A separate heating plate or the like is then not necessary, and the heating means are then also supplied with electric energy via the base plate. After release of the main body from the base plate the main body, the drive means and the heating means are no longer connected to the mains electricity or electrical system, and they can be moved freely relative to the base plate. This results in advantages in respect of safety and convenience of use.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1A:
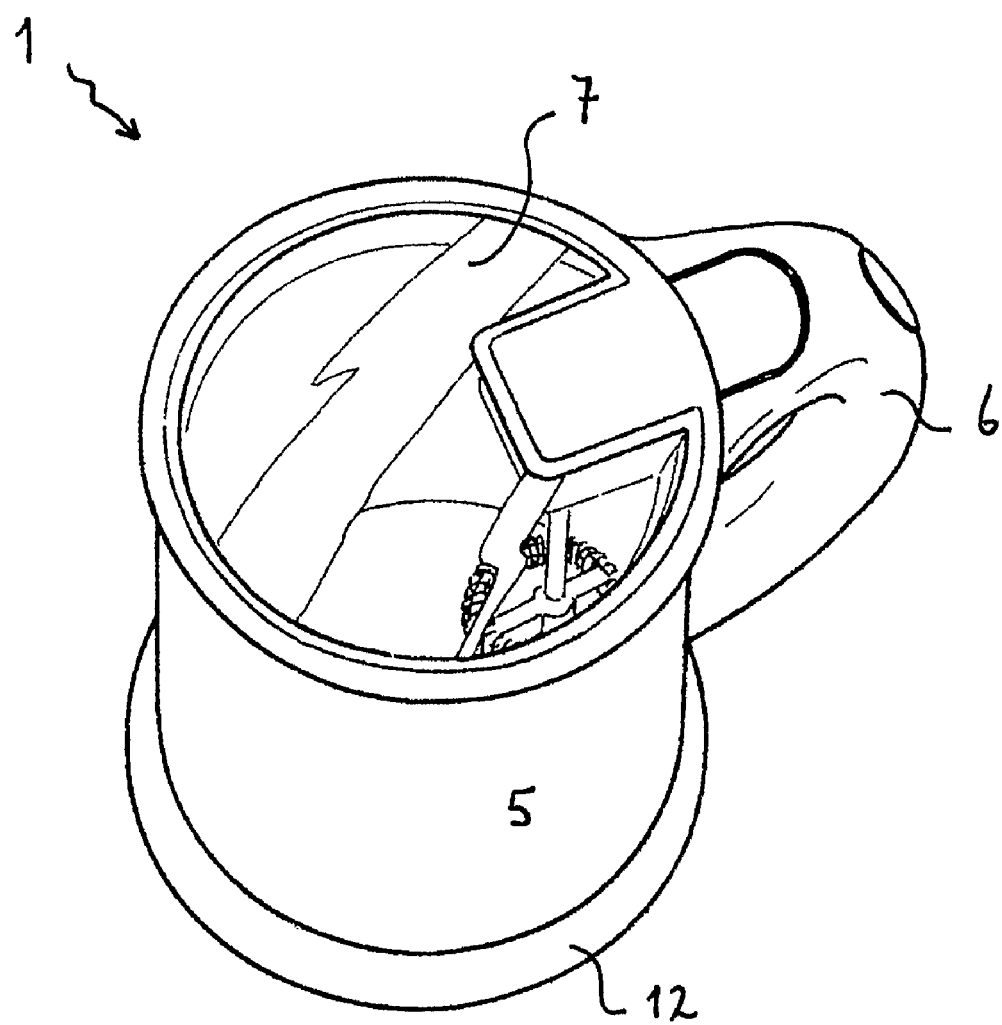
FIG. 1A is a perspective view of a first exemplary embodiment of a device according to the invention.

The devices (1,2) shown in the figures each comprise agitation means (3) and drive means (4) for driving thereof, in addition to a main body (5) which forms a container (15) for the milk and in which an electric conductor (not shown) is arranged. Main body (5) comprises a handle (6) serving to facilitate manipulation thereof. Each device (1,2) comprises a cover (7,8) fitting onto main body (5), which covers (7,8) are placed in the given examples loosely on main body (5), but which could also be for instance hingedly connected thereto. Drive means (4) are provided with electrical energy by means of the electric conductor. For this purpose electrical contact is made between a first electric contact (21) on base plate (12) and a second electric contact (22, not shown) on main body (5) and also between a third electric contact (14, not shown) on drive means (4) and a fourth electric contact (13) on main body (5), in this case handle (6), wherein the electric conductor connects the second electric contact (22) to the fourth electric contact (13).

Figure 1B:
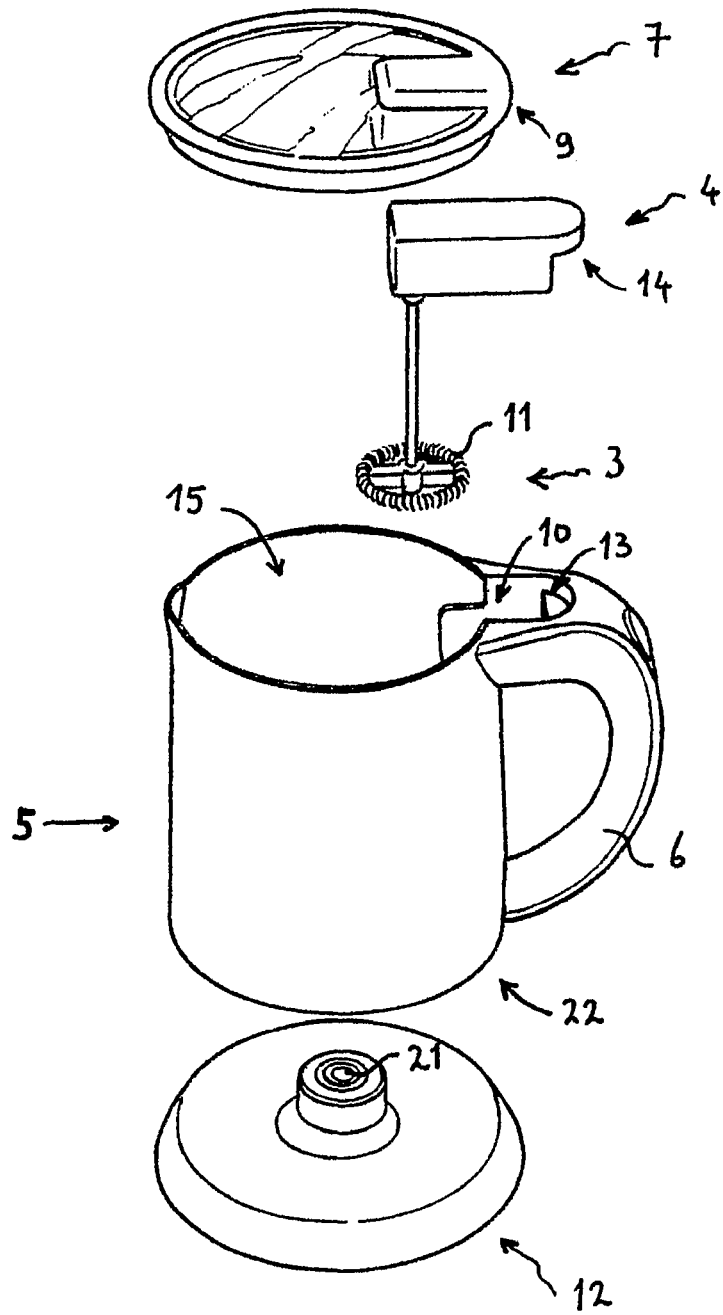
FIG. 1B is a perspective, exploded view of the device in FIG. 1A.
Figure 2A:
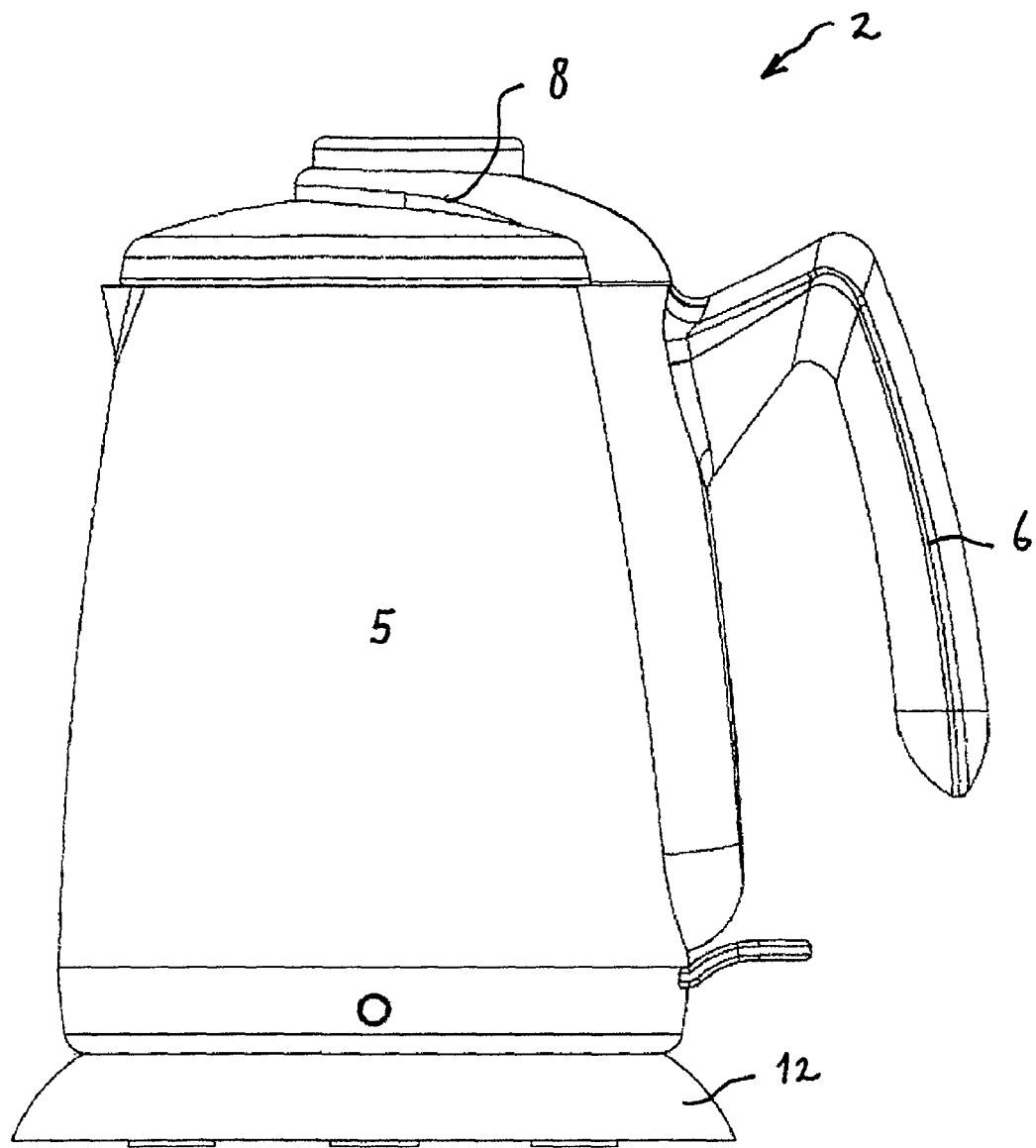
FIG. 2A is a side view of a second exemplary embodiment of a device according to the invention.
Figure 2B:
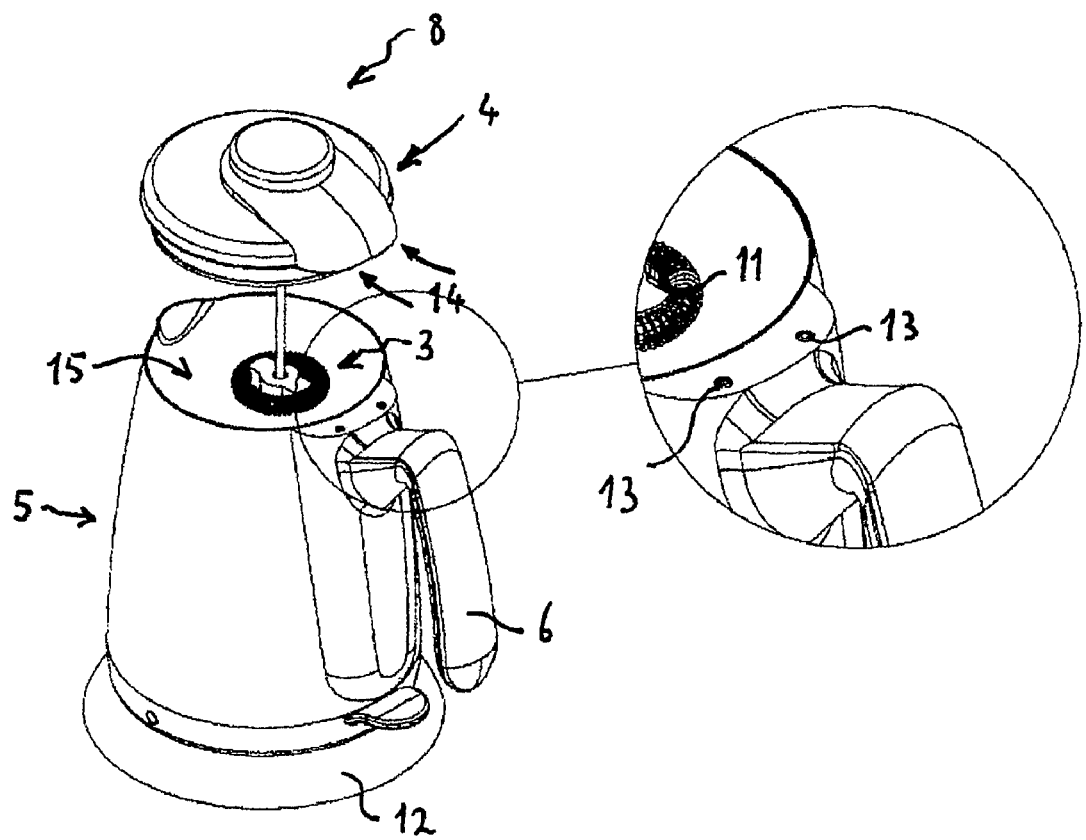
FIG. 2B is a perspective, partially exploded view of the device in FIG. 2A.

In the shown first exemplary embodiment (1), as shown in FIGS. 1A and 1B, drive means (4) are received partly in a recess (9) provided for this purpose in cover (7) and also received partly in a recess (10) provided for this purpose in main body (5), in this case handle (6). Main body (5), cover (7) and drive means (4) are mutually releasable, see FIG. 1b, which makes cleaning of device (1) simple. When reassembled, drive means (4) are automatically positioned correctly. After reassembly the drive means (4) are supported by cover (7) and main body (5), in this case handle (6). No separate frame or separate cord is thus necessary to support drive means (4) and/or for the electric power supply thereto. In the second exemplary embodiment (2), as shown in FIGS. 2A and 2B, the drive means (4, not shown) are wholly received in cover (8) and connected fixedly thereto.

Agitation means (3) include an annular spiral spring (11) which is found to suffice well in practice. Agitation means (3) are mechanically coupled in releasable manner to drive means (4), whereby cleaning becomes simpler and the user can, if desired, easily exchange the agitation means (3), in this case annular spiral spring (11), for a different type. Agitation means (3) are placed out of the centre of container (15), this being found to result in a better mixing and frothing of the milk.

Devices (1,2) also comprise heating means (not shown) with which the milk for frothing can be heated to a desired temperature in container (15). The heating means are received in main body (5) so that a separate heating plate or the like is not necessary. The heating means are also supplied with electrical energy via first contact (21) in base plate (12). After removal of main body (5) from base plate (12), main body (5), drive means (4), cover (8) and the heating means are no longer connected to the mains electricity and can be moved freely relative to base plate (12). This results in advantages in respect of safety and convenience of use.

It will be apparent to those of ordinary skill in the art that the invention is by no means limited to the given exemplary embodiments, but that many variants are possible within the scope of the invention. For example, devices according to various embodiments of the invention can also be used to heat and/or stir and/or froth beverages other than milk. Accordingly, other embodiments are within the scope of the following claims.

The invention claimed is:

1. A device for frothing milk, comprising:
   a main body, the main body forming a container for the milk;
   a cover fitting onto the main body; and
   agitation means and drive means for driving the agitation means, wherein the drive means are received at least partially in the cover,
wherein:
   the device further comprises a base plate provided with a first electric contact;
   the main body is provided with a second electric contact, which second electric contact makes electrical contact with the first electric contact when the main body is placed on the base plate;
   the drive means are provided with a third electric contact;
   the main body is provided with a fourth electric contact, which fourth electric contact makes electrical contact with the third electric contact when the cover is placed on the main body; and
   the main body is provided with an electric conductor which forms an electrical connection between the second electric contact and the fourth electric contact.

2. The device of claim 1, wherein the drive means are connected mechanically in fixed manner to the cover.

3. The device of claim 1, wherein the drive means are mechanically coupled in releasable manner to the cover.

4. The device of claim 1, wherein the drive means are at least partially received in a recess provided for this purpose in the main body.

5. The device of claim 4, wherein the main body comprises a handle and the recess is arranged in the handle.

6. The device of claim 1, wherein the agitation means are coupled mechanically in releasable manner to the drive means.

7. The device of claim 1, wherein the agitation means comprises a substantially annular spiral spring.

8. The device of claim 1, wherein the agitation means are placed off center in the container.

9. The device of claim 1, wherein the device further comprises heating means, which heating means are at least partially received in the main body.

10. The device of claim 9, wherein the heating means makes electrical contact with the first electric contact when the main body is placed on the base plate.

* * * * *